(12) United States Patent
Lewis et al.

(10) Patent No.: US 11,046,104 B2
(45) Date of Patent: Jun. 29, 2021

(54) SECURITY PRINTING

(71) Applicant: Inovink Limited, Sheffield (GB)

(72) Inventors: David Malcolm Lewis, Sheffield (GB); David Bedford, Sheffield (GB)

(73) Assignee: INOVINK LIMITED, Sheffield (GB)

( * ) Notice: Subject to any disclaimer, the term of this patent is extended or adjusted under 35 U.S.C. 154(b) by 0 days.

(21) Appl. No.: 16/639,855

(22) PCT Filed: Jun. 29, 2018

(86) PCT No.: PCT/GB2018/051832
§ 371 (c)(1),
(2) Date: Feb. 18, 2020

(87) PCT Pub. No.: WO2019/034833
PCT Pub. Date: Feb. 21, 2019

(65) Prior Publication Data
US 2020/0361228 A1 Nov. 19, 2020

(30) Foreign Application Priority Data
Aug. 18, 2017 (GB) .................................. 1713304

(51) Int. Cl.
*B42D 25/29* (2014.01)
*B42D 25/382* (2014.01)
(Continued)

(52) U.S. Cl.
CPC ............. *B42D 25/29* (2014.10); *B42D 15/00* (2013.01); *B42D 25/382* (2014.10); *C09D 11/037* (2013.01)

(58) Field of Classification Search
CPC ...... B42D 25/29; B42D 25/382; B42D 15/00; C09D 11/037
(Continued)

(56) References Cited

U.S. PATENT DOCUMENTS

| | | | |
|---|---|---|---|
| 2010/0059691 A1 | 3/2010 | Lewis et al. | |
| 2014/0147576 A1* | 5/2014 | Lewis | B42D 25/29 427/7 |
| 2016/0243877 A1 | 8/2016 | Lewis et al. | |

FOREIGN PATENT DOCUMENTS

| | | |
|---|---|---|
| GB | 2535884 A | 8/2016 |
| JP | 2010084079 A | 4/2010 |
| WO | 2007091094 A1 | 8/2007 |

OTHER PUBLICATIONS

PCT International Search Report and Written Opinion for International Application No. PCT/GB2018/051832, dated Aug. 14, 2018, 12 pages.
(Continued)

*Primary Examiner* — Justin V Lewis
(74) *Attorney, Agent, or Firm* — Hoffman Warnick LLC

(57) ABSTRACT

A composition comprising a first infrared absorbing material which is a doped metal oxide comprising indium and/or tin; and a second infrared absorbing material which is a compound selected from: or a salt or polymer thereof, wherein —M is a metal selected from a group 3-10 (Group 1MB-VIII) element or a lanthanide; —$R_1$ is selected from hydrogen, phosphonate, sulphonate, nitro, halo, cyano, thiocyano, thioalkyl, thioaryl, alkyl, alkoxy, aryl, aryloxy, amines, substituted amines and substituted aryl; —one of $R_2$ and $R_3$ is oxygen and the other of $R_2$ and $R_3$ is NO; —n is a number
(Continued)

Figure 1:
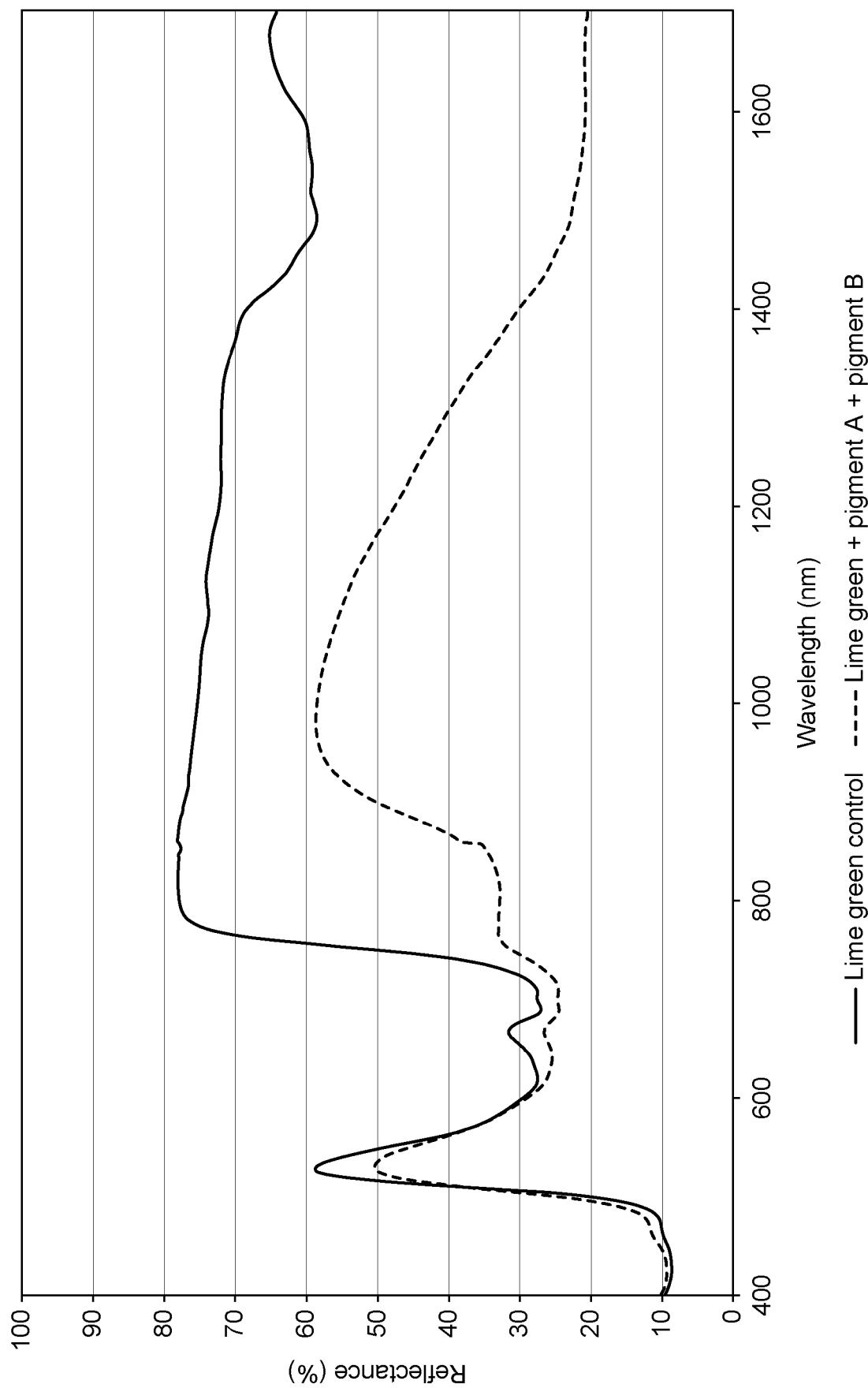

corresponding to half the co-ordination number of the metal M; —each L and L' is independently a ligand complexed to the metal M; and —y is a number corresponding to the co-ordination number of the metal M.

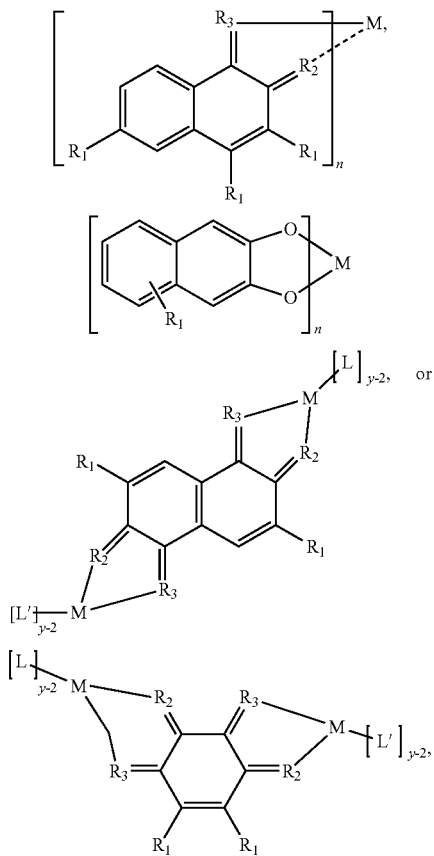

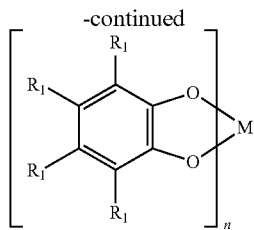

18 Claims, 2 Drawing Sheets

(51) Int. Cl.
    *B42D 15/00*     (2006.01)
    *C09D 11/037*     (2014.01)
    *B41M 3/14*     (2006.01)
    *B42D 25/378*     (2014.01)
    *C09D 11/03*     (2014.01)
    *C09K 11/60*     (2006.01)
    *G01N 33/32*     (2006.01)
(58) Field of Classification Search
    USPC ....... 283/67, 70, 72, 74, 94, 95, 96, 98, 901
    See application file for complete search history.

(56) References Cited

OTHER PUBLICATIONS

Great Britain Search Report for Application No. GB1713304.2, dated Nov. 1, 2017, 4 pages.
Kim et al., "Preparation and property control of nano-sized indium tin oxide particle," Elsevier, Materials Chemistry and Physics 86, 2004, pp. 210-221.
Guenther et al., "Formation of metallic indium-tin phase from indium-tin-oxide nanoparticles under reducing conditions and its influence on the electrical properties," Journal of Applied Physics 104, American Institute of Physics, 2008, 10 pages.

* cited by examiner

SECURITY PRINTING

The present invention relates to articles comprising a security feature and to compositions and methods relating thereto. In particular the invention relates to articles comprising a security image.

Articles comprising security images are well known. Security images generally comprise an image which is invisible or undetectable under ambient conditions, and which can be rendered visible or detectable by application of a suitable stimulus; or alternatively, the image may change from one colour under ambient conditions to another colour upon application of a stimulus.

Security images may be manufactured by coating security inks or compounds onto a substrate. Examples of known compounds which when coated onto a substrate provide a security image include photochromic compounds which generally change from colourless to coloured upon the application of ultraviolet light, and thermochromic compounds which generally change from colourless to coloured upon the application of heat. The present invention relates to the use of infrared absorbing compounds which can be detected by the application of infrared light.

Image articles which include security images are useful in many areas of industry such as in packaging, identification cards, and labels, for example. It is useful to provide packaging which includes a security image invisible to a user under ambient conditions, but which can be rendered visible upon application of a stimulus; for example, if a customs and excise official wishes to check that imported goods are genuine goods or whether they are counterfeit goods. If the packaging includes the security image, rendered visible or detectable by suitable stimulus, the customs and excise official can determine that the packaging, and hence the goods, are not counterfeit. Likewise, it is advantageous to provide an identification card in which an image is invisible or a defined colour under ambient conditions, but which can be rendered visible or detectable, or change colour upon application of a stimulus in order to prove the identity of a user of the identity card, and in order to determine that the identity card is genuine and not a counterfeit identity card.

In the manufacture of bank notes, it is desirable to include as many security features as possible, which may include multiple security images using a variety of compounds capable of changing colour upon application of a stimulus (including movement of the bank note to change viewing angle), or turning coloured from colourless, or vice versa.

The present invention relates in particular to security images which are visible upon application of infrared light. Such images are suitably not visible under ambient conditions but become visible when infrared light is applied.

The infrared region of the electromagnetic spectrum includes light of wavelength 700 nm to 1 mm and different materials absorb different wavelengths of light within this range. Some infrared materials absorb infrared radiation over a broad range of wavelengths within the infrared range. Other materials may absorb infrared radiation in one or two sharp narrow ranges. Some materials may have a broad absorption peak and one or more sharp absorption peaks.

The use of infrared materials as security features on articles is known. The presence of the infrared material can be verified using detection apparatus which emits light at a particular wavelength. A number of different types of apparatus are known. For example handheld devices used by individuals or small businesses may be quite different to apparatus used in banks or sorting offices and different again to detectors used in vending machines and the like.

It is desirable to include security features that can be detected by different types of apparatus and to include security features that can be detected at different wavelengths.

Counterfeiting is a serious problem across many sectors and, due to improvements in technology, counterfeiters are becoming increasingly sophisticated. In terms of infrared security images, it is desirable to provide an image which has a highly unique infrared spectrum that is difficult to reproduce.

Security features used on banknotes and the like need to be heat and UV resistant, water resistant, chemically resistant, and have excellent photostability.

The present inventors have surprisingly found that certain combinations of infrared absorbing materials provide security features having highly advantageous properties.

According to a first aspect of the present invention there is provided a composition comprising a first infrared absorbing material which is a doped metal oxide comprising indium and/or tin; and a second infrared absorbing material which is a compound selected from:

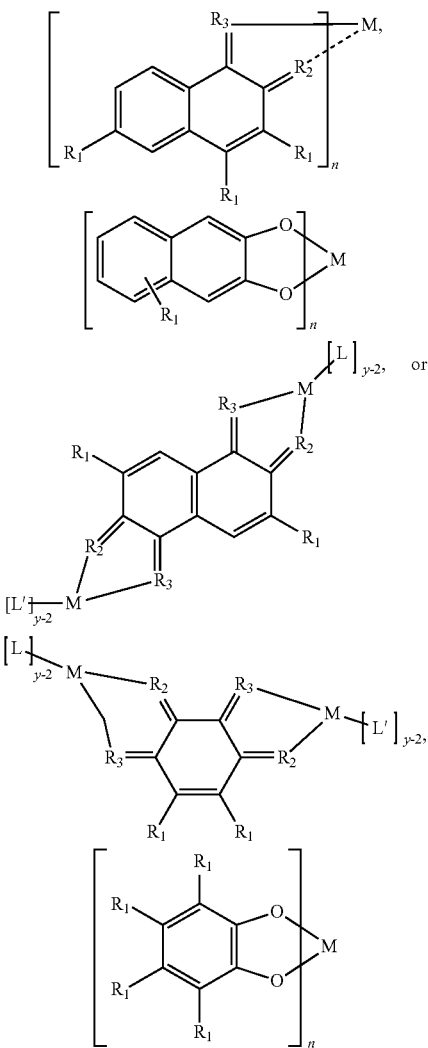

or a salt or polymer thereof, wherein
M is a metal selected from a group 3-10 (Group IIIB-VIII) element or a lanthanide;
$R_1$ is selected from hydrogen, phosphonate, sulphonate, nitro, halo, cyano, thiocyano, thioalkyl, thioaryl, alkyl, alkoxy, aryl, aryloxy, amines, substituted amines and substituted aryl;
one of $R_2$ and $R_3$ is oxygen and the other of $R_2$ and $R_3$ is NO;
n is a number corresponding to half the co-ordination number of the metal M;
each L and L' is independently a ligand complexed to the metal M; and
y is a number corresponding to the co-ordination number of the metal M.

The first infrared material is a doped metal oxide comprising indium and/or tin.

By doped metal oxide we mean to refer to a metal oxide compound which comprises an oxide of a first metal as its major constituent but in which a proportion of the first metal atoms are replaced or "doped" with atoms of one or more further elements. The doped metal oxide compounds used in the present invention comprise indium and/or ion. However other atoms may also be present in the doped metal oxide.

Preferably the doped metal oxide is a doped tin oxide or a doped indium oxide. In such compounds the tin oxide or the indium oxide which is the major constituent of the material may be regarded as providing the host lattice. Other atoms, for example other metal atoms, are incorporated within the structure of the host lattice.

In some embodiments the doped metal oxide is a doped tin oxide.

By doped tin oxide we mean to refer to a material which is based on a tin oxide, especially a tin (IV) oxide in which some of the tin atoms have been replaced by one or more different elements. These different elements may be referred to as dopant elements.

In some embodiments the doped tin oxide is derived from a cassiterite form of tin oxide.

Suitably in the doped tin oxide less than 50 mol % of the tin atoms are substituted with a dopant.

Preferably at least 0.1 mol % of the tin atoms are substituted with a dopant, preferably at least 0.5 mol %, more preferably at least 1 mol %.

Suitably up to 40 mol % of the tin atoms are substituted with a dopant, preferably up to 30 mol %, more preferably up to 25 mol %.

The level of dopant in the tin oxide will depend on a number of factors including the nature of the dopant(s), the concentration at which the tin oxide is to be used, the nature of the substrate and the desired conductivity and IR absorption characteristics.

In preferred embodiments the dopant is present in a concentration of from 2 to 20 mol %, preferably 3 to 15 mol %.

The tin oxide is suitably doped with one or more elements selected from indium, antimony, tungsten, phosphorus, copper, niobium, manganese, fluorine and nickel.

Preferably the tin oxide is doped with one or more elements selected from indium, antimony, tungsten and phosphorous.

Most preferably the tin oxide is doped with antimony.

In some preferred embodiments the tin oxide is doped only with antimony. In such embodiments the antimony is present in an amount of from 0.5 to 20 mol %, preferably 2 to 18%, more preferably 5 to 15 mol %.

In some embodiments the tin oxide is doped with antimony and tungsten. In such embodiments antimony is preferably present in an amount of from 6 to 10, preferably 7 to 9, for example about 8 mol % and tungsten is present in an amount of from 1 to 5, preferably 2 to 4, for example about 3 mol %.

In some embodiments the tin oxide is doped with antimony and phosphorus. In such embodiments phosphorous is preferably present in an amount of from 1 to 5, preferably from 2 to 4, for example about 3 mol %, and antimony is present in an amount of from 5 to 10, preferably 7 to 9, for example about 8 mol %.

In some embodiments the doped metal oxide is a doped indium oxide. Such materials are based on indium oxide in which some of the indium atoms have been replaced by one or more dopant elements.

Suitable dopant elements include tin, zinc, aluminium, gallium and mixtures thereof.

Preferably at least 0.1 mol % of the indium atoms are substituted with a dopant, preferably at least 0.5 mol %, more preferably at least 1 mol %.

Suitably up to 40 mol % of the indium atoms are substituted with a dopant, preferably up to 30 mol %, more preferably up to 25 mol %.

In some preferred embodiments the indium oxide is doped with tin. In such embodiments the indium is suitably present in an amount of from 1 to 20, mol %, preferably 5 to 15 mol %.

In one embodiment the doped indium oxide comprises 90% indium oxide and 10% tin oxide.

One preferred doped indium oxide is reduced indium tin oxide. This material is obtained by preparing tin doped indium tin oxide and then reacting with a reducing agent. This reduces the oxygen content in the lattice. A gaseous reducing agent (for example hydrogen or carbon monoxide) or a liquid reducing agent (for example oxygenated solvents, citric acid) may be used. The synthesis of such compounds is within the competence of a person skilled in the art.

The oxygen content of the lattice may be reduced by 0.5 to 5 wt %. The reduction process may not only form oxygen deficiencies in the crystal lattice, but also form nanoparticles and nanoalloys of tin and indium providing advantageous properties. The preparation of reduced indium tin oxide compounds suitable for use herein is described by Kim et al (Materials Chemistry and Physics 86, 2004, 210-221) and Guenther et al (Journal of Applied Physics, 104, 034501 (2008)).

The composition of the present invention comprises a second infrared absorbing material. The second infrared absorbing material is a compound selected from:

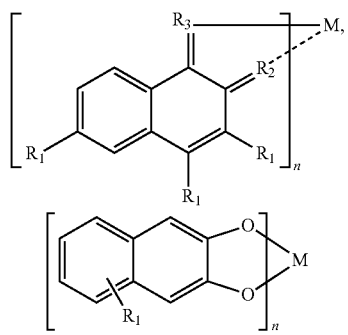

-continued

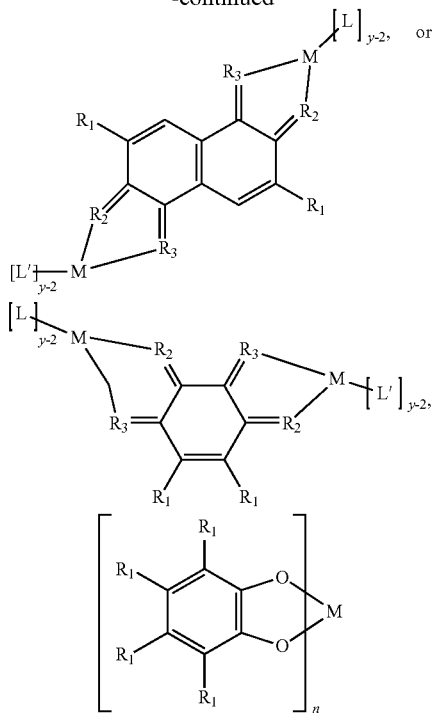

or a salt or polymer thereof.

M is a metal selected from a group 3-10 (Group IIIB-VIII) element or a lanthanide. Suitably M is selected from iron, cobalt, nickel, aluminium, scandium, chromium, vanadium, titanium, manganese or a lanthanide. Most preferably, M is selected from iron, cobalt and lanthanum.

Preferably, M is a metal having a co-ordination number of 6 or 8, and n is correspondingly 3 or 4, and y is correspondingly 6 or 8.

Preferred salts of the second infrared absorbing material include compounds of formula:

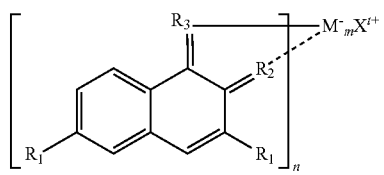

wherein M, n and $R_1$, $R_2$ and $R_3$ are as described above, X is a metal cation selected from a group 1 or 2 metal (alkali metal and alkaline earth metal) and aluminium, and the sum of m and t correspond to the total number of negative charges on the compound.

Particularly preferred salts include those of formula:

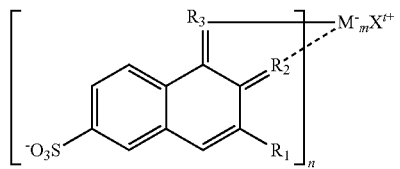

wherein M, X, n, m and t are as described herein above.

Particularly preferred salts include those having the following formulae:

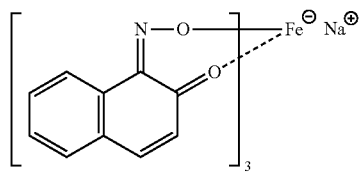

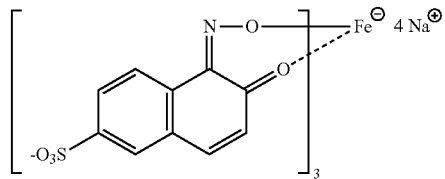

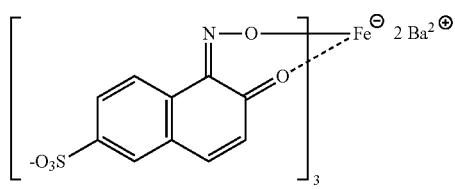

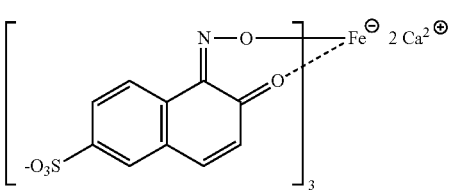

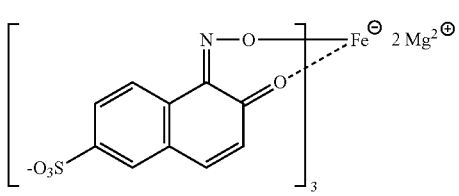

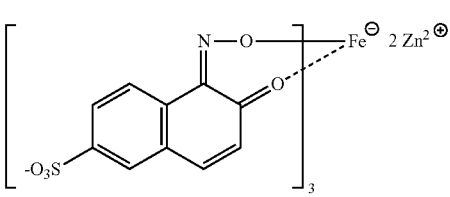

and,

-continued

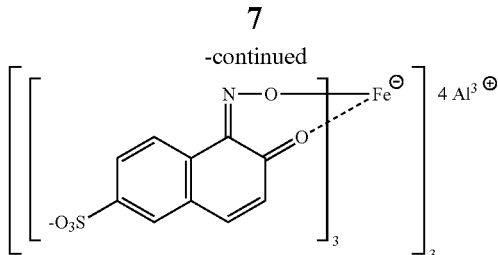

Each L and/or L' is preferably independently selected from chlorine, bromine, hydroxyl, water or pairs of ligands of group L and/or group L' may comprise a single ligand forming a ring structure with metal M, and may for example be formed from 1,3-dinitroso-2,4-dihydroxybenzene or 1,5-dinitroso-2,6-dihydroxy-naphthalene groups connected to the metal M via the nitroso and hydroxyl groups.

In some preferred embodiments, the compound of the security image coated onto the substrate has the formula:

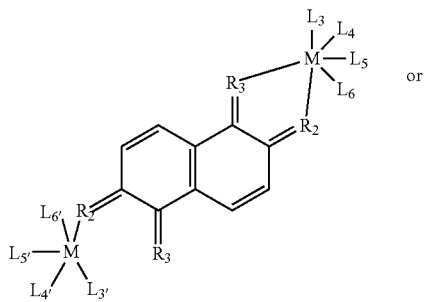 or

-continued

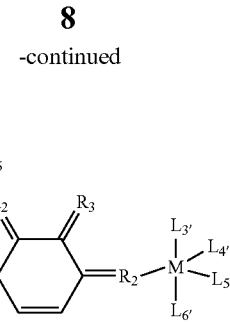

wherein M, $R_2$ and $R_3$ are as described herein above, L1-L6 and L1'-L6' are ligands independently selected from chlorine, bromine, hydroxyl, water, or any number of pairs of L3-L6 and/or L3'-L6' may be combined of a single ligand forming a ring structure with metal M, and may for example be formed from 1,3-dinitroso-2,4-dihydroxybenzene, or 1,5-dinitroso-2,6-dihydroxynaphthalene, connected to the metal M via the nitroso and hydroxyl groups.

Polymers of the infrared-absorbing compounds are preferably dendritic polymers in which each M is complexed to three dinitroso-2,4-dihydroxybenzene or three dinitroso-2,6-dihydroxynaphthalene groups (preferably 1,3-dinitroso-2,4-dihydroxybenzene, 1,5-dinitroso-2,6-dihydroxynaphthalene or 1,5-dihydroxy-4,8-dinitrosonaphthalene).

Examples of preferred polymeric forms of the second infra-red absorbing material useful for the invention are:

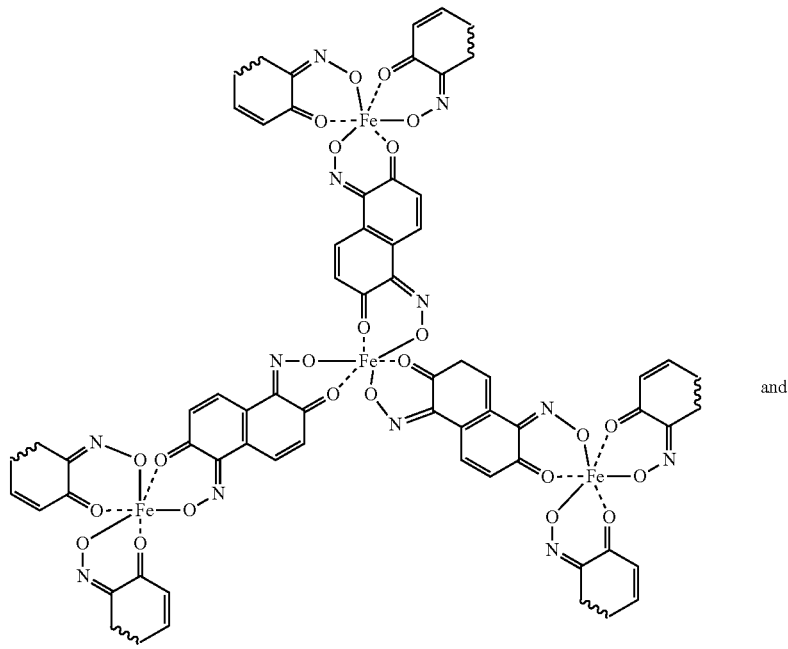 and

-continued

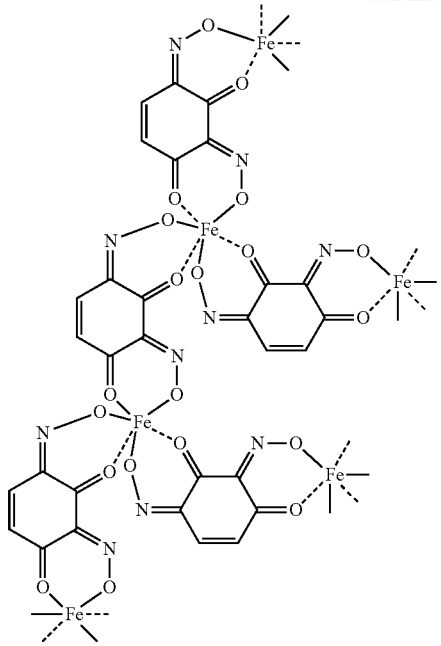

and wherein Fe may be replaced with any other metal M as described above.

In especially preferred embodiments the second infrared absorbing material is the compound of formula:

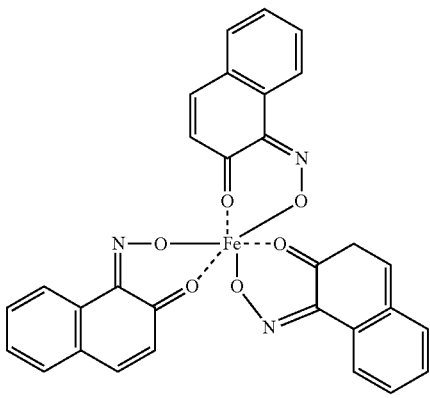

This compound is commercially available as C.I. Pigment Green 8.

The composition of the first aspect of the present invention may be provided in any suitable form. For example it may be provided in the form of an ink, a varnish or as a polymeric composition or polymer precursor composition.

In some embodiments the composition may comprise a polymer melt or pellets of polymer.

In some embodiments the composition may comprise a polymer precursor composition for example a composition comprising monomers which may be activated to undergo a polymerisation reaction.

In some especially preferred embodiments the composition is an ink composition.

The ink composition is suitably a solution or suspension comprising the first and second infrared absorbing materials.

Each of the first and second infrared absorbing materials may be suitably incorporated into the ink composition in the form of a powder. In some preferred embodiments each powder has an average particle size of less than 1 micron.

In some embodiments the first and second infrared absorbing materials are each provided as nanoparticles. However microparticles may also be used.

In some embodiments the ink composition may be an aqueous composition. In some embodiments the ink composition may be an oleophilic composition. In some embodiments the ink composition may be a solvent based composition.

The selection of an aqueous based ink composition or an oleophilic based ink composition depends on how the ink is intended to be applied to the substrate. The choice of a suitable base ink composition will be within the competence of the person skilled in the art.

The base ink composition may be suitable for any type of printing, for example offset printing (both lithographic and gravure), intaglio printing, letter-press printing, ink-jet printing and screen printing.

Aqueous ink compositions are typically used in screen printing and inkjet printing.

Oleophilic compositions are preferred for offset printing (including lithographic and gravure printing), intaglio printing and letter press printing. They can also be used in inkjet printing.

In inkjet printing the ink composition may have an organic solvent base. Suitable organic solvents include acetone and other ketones, for example methyl ethyl ketone.

For some applications monomer based inks may be used, for example acrylic inks.

Rubber based inks may be used in lithographic, offset, letterpress and screen printing.

In preferred embodiments the ink composition is an oleophilic composition.

When the composition is an oleophilic composition the major component of the ink may be an oil, for example linseed oil. Other components typically present in printing inks will be known to the person skilled in the art.

The first infrared absorbing material is preferably present in the ink composition in an amount of at least 0.1 wt %, preferably at least 1 wt %, more preferably at least 2 wt %, suitably at least 5 wt %, preferably at least 8 wt %, for example at least 10 wt %.

The first infrared absorbing material may be present in a composition in an amount of up to 50 wt %, suitably up to 40 wt %, for example up to 30 wt % or up to 25 wt %.

The second infrared absorbing material is preferably present in the ink composition in an amount of at least 0.01 wt %, preferably at least 0.05 wt %, more preferably at least 0.1 wt %, suitably at least 0.2 wt %.

The second infrared absorbing material may be present in a composition in an amount of up to 50 wt %, suitably up to 40 wt %, preferably up to 20 wt %, more preferably up to 15 wt %, for example up to 10 wt %.

The amounts of each material present in the composition and the relative concentration of each component varies depending on the intended use thereof and the nature of the ink composition. For example greater concentrations of the second infrared absorbing material are typically used in offset printing inks compared with intaglio printing inks.

Suitably the first infrared absorbing material is present in a higher concentration than the second infrared absorbing material.

The composition of the first aspect of the present invention may comprise one or more infrared absorbing materials of the first type defined herein (the first infrared absorbing material") and/or one more infrared materials of the second type defined herein ("the second infrared absorbing material"). In such embodiments the above amounts refer to the total of all such materials present in the composition.

The ink composition may comprise one or more further components for example varnishes, cosolvents, preservatives, drying agents, fragrances, thickeners, waxes and emulsifiers. Other suitable components will be known to the person skilled in the art.

In some embodiments the ink composition may comprise one or more further pigments and/or dyes.

In some embodiments there may be no further pigments or dyes present in the composition of the first aspect of the present invention.

The first infrared absorbing material has a first infrared reflectance spectrum and the second infrared absorbing material has a second infrared reflectance spectrum.

Preferably the first and second infrared reflectance spectra are different.

In some embodiments the first infrared-absorbing material may absorb radiation over a narrow range of wavelengths within the infrared region of the electromagnetic spectrum. In some embodiments the first infrared-absorbing material may absorb radiation over a broad range of wavelengths within the infrared region of the electromagnetic spectrum.

In some embodiments the second infrared-absorbing material may absorb radiation over a narrow range of wavelengths within the infrared region of the electromagnetic spectrum. In some embodiments the second infrared-absorbing material may absorb radiation over a broad range of wavelengths within the infrared region of the electromagnetic spectrum.

Materials which absorb over a narrow range may have an infrared spectrum which includes only a single sharp absorption peak or a spectrum having two or more absorption peaks.

Other materials may have an infrared absorption spectrum which has some regions which absorb radiation over a broad range and some narrower absorption peaks.

The first infrared absorbing material preferably absorbs radiation over a specific range of wavelengths within the infrared region of the electromagnetic spectrum.

The second infrared absorbing material preferably absorbs radiation over a broad range of wavelengths within the infrared region of the electromagnetic spectrum.

The infrared absorption spectrum of the composition of the first aspect is a combination of the infrared absorption spectrum of the first infrared absorbing material and the infrared absorption spectrum of the second infrared absorbing material. The relative concentration of the first infrared absorbing material and the second infrared absorbing material will affect the infrared absorption spectrum of the composition comprising the mixture of materials.

Suitably the range of wavelengths absorbed by the first infrared absorbing material overlaps with the range of wavelengths absorbed by the second infrared absorbing material.

In one especially preferred embodiment the composition comprises from 5 to 30 wt % of a first infrared absorbing material selected from indium tin oxide, reduced indium tin oxide and antimony doped tin oxide and from 0.1 to 20 wt % of a second infrared absorbing material selected which is a compound of formula

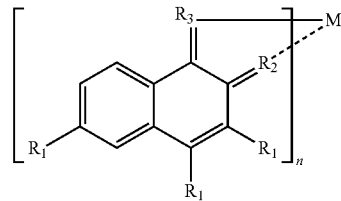

or a salt thereof.

In one embodiment the composition comprises from 1 to 50 wt %, preferably 10 to 30 wt % of the first infrared absorbing material, preferably an antinomy doped tin oxide, suitably containing 5 to 15 wt % antinomy; and from 0.01 to 5 wt %, preferably 0.1 to 1 wt % of the second infrared absorbing material, preferably C.I. Pigment Green 8.

In one embodiment the composition comprises from 1 to 30 wt %, preferably 5 to 20 wt % of the first infrared absorbing material, preferably reduced indium tin oxide; and from 0.1 to 20 wt %, preferably 1 to 10 wt % of the second infrared absorbing material, preferably C.I. Pigment Green 8.

According to a second aspect of the present invention there is provided an article comprising a substrate which carries a first infrared absorbing material which is a doped metal oxide comprising indium and/or tin and a second infrared absorbing material which is a compound selected from:

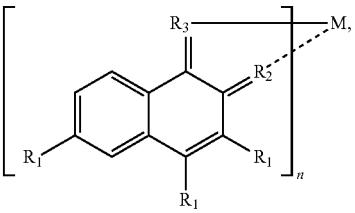

-continued

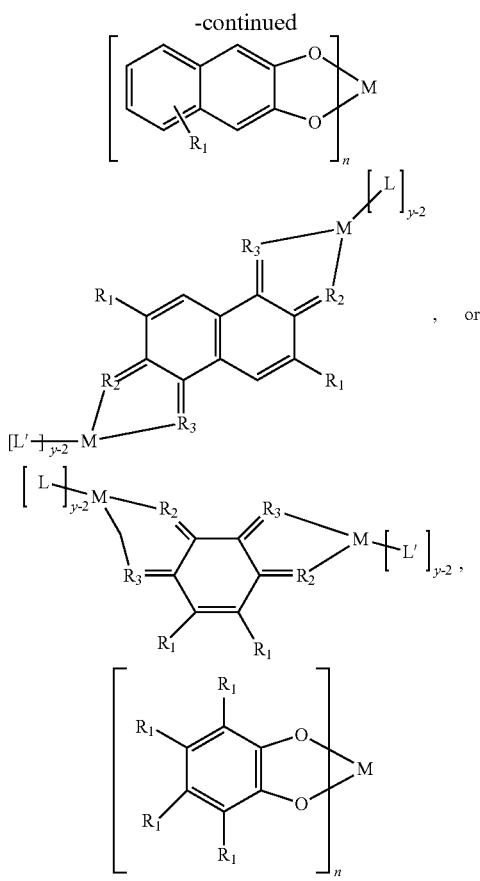

or a salt or polymer thereof, wherein
M is a metal selected from a group 3-10 (Group IIIB-VIII) element or a lanthanide;
$R_1$ is selected from hydrogen, phosphonate, sulphonate, nitro, halo, cyano, thiocyano, thioalkyl, thioaryl, alkyl, alkoxy, aryl, aryloxy, amines, substituted amines and substituted aryl;
one of $R_2$ and $R_3$ is oxygen and the other of $R_2$ and $R_3$ is NO;
n is a number corresponding to half the co-ordination number of the metal M;
each L and L' is independently a ligand complexed to the metal M; and
y is a number corresponding to the co-ordination number of the metal M.

The present invention relates to an article comprising a substrate which carries a first and second infrared absorbing material. Preferred features of the first and second infrared absorbing materials are as defined in relation to the first aspect.

The article may be selected from packaging, for example for pharmaceuticals; a label, for example for expensive or designer goods; an identification document, for example a passport, ID card or driving licence; a credit card or other bank card; a ticket or voucher, for example for events or travel; or a certificate, for example a share certificate or stamp certificate.

Most preferably the article is a banknote.

The article comprises a substrate. Preferably the substrate is a sheet substrate, preferably a planar sheet substrate. The substrate may be made from any suitable material. Suitable materials will be known to the person skilled in the art and include for example paper, cardboard, textiles and plastics materials.

In preferred embodiments in which the article is a banknote the substrate is selected from paper, a polymer or a mixture thereof. A preferred paper is banknote paper and a preferred polymer is biaxially oriented polypropylene. Other suitable papers and polymers will be known to the person skilled in the art.

Suitably the first infrared absorbing material and the second infrared absorbing material are provided at the same locus of the article.

The substrate carries a first infrared absorbing material and a second infrared absorbing material. By this we mean that the infrared absorbing materials are retained within or on the surface of the substrate. In some embodiments the infrared absorbing materials may be held within the body of the substrate, for example dispersed throughout the substrate. For example they may have been mixed within the raw ingredients used to make the substrate. In some embodiments the infrared absorbing materials may be incorporated in a thread woven into the substrate. In some embodiments the infrared absorbing materials may be in a coating on some or all of the substrate, on one or both planar surfaces of the substrate. In some embodiments the infrared absorbing materials may have been printed onto the substrate, on one or both planar surfaces of the substrate. In some embodiments the infrared absorbing materials may be incorporated only into one portion of the substrate. For example where a banknote includes a window, for example of a substantially transparent polymer, the infrared absorbing materials may only be present on the window portion or the non window portion.

Preferably the infrared absorbing materials are carried on the surface of the substrate. They may be present as a coating or a printed image. Suitably they may be printed in the form of a security image.

In especially preferred embodiments the article of the second aspect is coated or printed using a composition of the first aspect.

According to a third aspect of the present invention there is provided a method of manufacturing an article of the second aspect, the method comprising incorporating a first infrared absorbing material and a second infrared absorbing material into or onto the substrate.

Preferred features of the third aspect are as defined in relation to the first and second aspects.

In some embodiments the method of the third aspect may include mixing the first and second infrared absorbing materials into a raw ingredient used to make the substrate and then forming the substrate from the raw ingredient. For example the method of the third aspect may involve dosing the first and second infrared absorbing materials into a paper pulp or polymer pellets and then using the pulp or pellets to make the substrate.

In some embodiments the method of the third aspect may comprise applying a first composition comprising the first infrared absorbing material onto a surface of the substrate and separately applying a second composition comprising the second infrared absorbing material onto the surface of the substrate. The first and second compositions may be applied in either order.

In preferred embodiments the method of the third aspect comprises applying a single composition comprising the first and second infrared absorbing materials onto a surface of the substrate.

Thus the third aspect of the present invention suitably provides a method of manufacturing an article, preferably a banknote, the method comprising providing a substrate, preferably a substantially planar substrate, and applying to a surface of the substrate a composition of the first aspect.

In preferred embodiments the substrate is a planar substrate, preferably a banknote. The method of the third aspect may involve applying the composition to one or both surfaces of the substrate. The composition is suitably as defined in relation to the first aspect.

In some embodiments the composition may be coated onto the substrate by dipping, spraying, painting or rolling.

In some embodiments the infrared absorbing materials may be incorporated into a polymer melt composition or other composition which is painted, dipped or sprayed onto the substrate.

The third aspect of the present invention may comprise coating, spraying, dipping, painting or printing onto the surface of the substrate a composition comprising the the first and second infrared absorbing materials.

In some embodiments a composition comprising the first and second infrared absorbing materials may be coated onto one surface of the substrate. In some embodiments they may be coated onto both surfaces of a planar substrate. The composition may be applied to some or all of the surface or surfaces of the substrate. In some embodiments an image may be applied to the substrate using a printing technique.

In some preferred embodiments the method of the third aspect comprises printing a composition of the first aspect onto a surface of the substrate.

Any suitable printing technique may be used, for example offset printing (both lithographic and gravure), intaglio printing, letter-press printing, ink-jet printing and screen printing.

Preferably the composition is printed by intaglio printing.

Suitably the ink composition is coated or printed onto the substrate at a thickness of at least 1 micron. The thickness will depend on the printing technique used. For offset printing a thickness of 1 to 2 microns is typically used; for a varnish coating or gravure printing a thickness of 2 to 4 microns is preferred; and for intaglio printing a thickness of at least 5 microns, suitably about 8 microns and up to 40 or even up to 80 microns may be used.

The composition may be coated or printed onto one or both sides of the substrate.

In some embodiments the composition may be provided as an overcoat varnish.

The article of the second aspect of the present invention comprises first and second infrared absorbing materials incorporated within or, preferably, applied to the surface thereof. The article absorbs infra-red radiation at the locus which carries the first and second infrared absorbing materials.

Suitably a locus of the surface of the article which carries the first and second infrared absorbing materials absorbs infra-red radiation. Suitably the locus of the article which carries the first and second infrared absorbing materials exhibits non-uniform absorption of radiation in the infra-red range.

The inclusion of two different infrared absorbing materials in the composition and article of the present invention is highly advantageous.

Preferably the locus of the article which carries the first and second infrared absorbing materials and the composition of the first aspect has an infrared absorbance of at least 30%, preferably at least 40%, more preferably at least 45% and most preferably at least 50%, of at least one wavelength of infrared radiation.

More preferably the locus of the article which carries the first and second infrared absorbing materials has an infrared absorbance of at least 30%, preferably at least 40%, more preferably at least 45% and most preferably at least 50%, of at least two different wavelengths of infrared radiation.

In some preferred embodiments the locus of the article which carries the first and second infrared absorbing materials has an absorbance of at least 30% preferably at least 40%, more preferably at least 50% of at least one wavelength in the range 800-900 nm and an absorbance of at least 10 to 30%, preferably at least 40%, more preferably at least 50% of at least one wavelength in the range 1000-1500 nm.

The use of the particular first and second infrared absorbing materials of the present invention provides a unique absorption spectrum which couldn't be achieved by the use of a single material alone. This means that more sophisticated detection techniques can be used and the characteristics are more difficult for counterfeiters to imitate.

Suitably the locus which carries the first and second infrared absorbing materials has a first absorbance $\lambda_1$ of infra-red radiation at a first wavelength $\lambda_1$ and a second absorbance $\lambda_2$ infra-red radiation at a second wavelength $\lambda_2$ wherein the absorbance $A_1$ at $\lambda_1$ is different to the absorbance $A_2$ at $\lambda_2$. Preferably the difference in absorbance is at least 1%, preferably at least 2%, more preferably at least 5%.

Suitably $\lambda_1$ and $\lambda_2$ are wavelengths within the infra-red range. Preferably $\lambda_1$ and $\lambda_2$ are each within the range 700 to 2000 nm, preferably within the range 800 to 1800 nm. In some preferred embodiments $\lambda_1$ and $\lambda_2$ are within the range 800 to 1500 nm.

In some embodiments the infrared absorption of the article which carries the first and second infrared absorbing materials increases smoothly over the range 1000 nm to 1500 nm.

Suitably the inclusion of the first and second infrared absorbing materials within or on the surface of the substrate does not substantially alter the colour of the substrate in the visible range.

Suitably the difference in colour between the substrate with and without the first and second infrared absorbing materials (dE, also referred to as ΔE, dE* and ΔE*) is less than 4, preferably less than 2, more preferably less than 1. The skilled person will appreciate that a dE of less than 1 is generally considered to be imperceptible to the human eye.

Because the presence of the infrared absorbing materials does not substantially affect the colour of the substrate it may be used to provide a hidden or covert security feature.

In some embodiments the substrate may be printed with two paired inks. Suitably in such embodiments a first portion of the substrate is printed with a first ink pair composition and a second portion of the substrate is coated with a second ink pair composition wherein the second ink pair composition has all of the same components as the first ink pair composition except that it further comprises the first and second infrared absorbing materials.

Thus the paired inks are suitably identical except for the inclusion of the first and second infrared absorbing materials.

Suitably the colour difference dE between the first portion of the substrate printed with the first ink pair composition of the paired inks and the second portion of the substrate printed with the second ink pair composition of the paired inks is less than 4, preferably the dE is less than 2, more preferably less than 1.

The article, especially when a banknote, may include one or more further security features, for example a UV image/phosphor, an NIR-absorbing image, a holographic feature, a watermark, a thread, a magnetic image, windows, a colour shift/colour change image or a microprinting feature. Further features will also be known to the person skilled in the art.

According to a fourth aspect of the present invention there is provided the use of a first infrared absorbing material and a second infrared absorbing material as defined in the relation to the first aspect to provide a covert security image or a hidden coating on a banknote.

Suitably the fourth aspect of the present invention provides the use of a composition of the first aspect to provide a covert security image or a hidden coating on a banknote.

The combination of the first and second infrared absorbing materials for use in the invention is particularly advantageous for use as covert security features because they produce a distinctive and variable absorption in the infra-red region but low absorbance in the visible region of the electromagnetic spectrum. Preferably the first and second infrared absorbing materials used in the invention suitably are not strongly coloured.

The variable infra-red absorption can be used in an authentication method.

According to a fifth aspect of the present invention there is provided a method of detecting a genuine article of the second aspect, the method comprising measuring at a locus on the article the absorption $A_1$ of radiation at a first wavelength $\lambda_1$, and the absorption $A_2$ of radiation at a second wavelength $\lambda_2$, wherein $\lambda_1$ and $\lambda_2$ are in the infra-red range.

In some embodiments the method may further involve calculating the ratio of $A_1$ to $A_2$.

Suitably the ratio of $A_1$ to $A_2$ is compared with a standard and if it matches the standard the article can be determined to be genuine.

In some embodiments the method of the fifth aspect of the present invention may involve measuring the absorbance of radiation at more than two wavelengths. The measurement of further absorbancies allows further ratios to be calculated, providing a higher degree of certainty that an article is authentic.

In some preferred embodiments $\lambda_1$ and/or $\lambda_2$ are in the range of 900 to 1800 nm. This allows infra-red radiation to be detected using InGaAs (indium gallium arsenide) detectors. Such detectors are more specialist and less commonly used by counterfeiters than other infra-red detectors which detect at lower wavelengths.

The authentication method of the invention relies on the measurement of the relative absorbance of two different wavelengths on the article (e.g. banknote) at the locus which carries the first and second infrared absorbing materials. The method determines the relative absorption at two different wavelengths and suitably compares this with a standard, and can be carried out on a large scale.

For example multiple banknotes per second can be passed through a detector and the relative absorption ratio compared with the standard in an automated process.

The authentication method of the fifth aspect of the invention may find utility in a number of applications. For example a handheld device able to authenticate a single banknote at a time could be provided for use by small traders; a countertop device capable of evaluating multiple banknotes in an automatic method could be provided for use in a bureau de change or a vending machine; a device which validates individual notes as they are dispensed in an ATM could be provided; or equipment able to rapidly authenticate large numbers of notes, for example high speed note sorting.

Preferably the article of the second aspect is a banknote. Preferably it has a coating comprising the first and second infrared absorbing materials or is printed with an image comprising the first and second infrared absorbing materials. Suitably the doped tin oxide coating or image is durable to heat, light, water, chemicals and mechanical impact, abrasion and wear and tear. Suitably the coating or image is durable to laundering and to UV light from sunlight.

However all banknotes and other articles will become worn over time, and the quality of the infrared absorbing coating or image may deteriorate. As the absorption of the coating/image depends on the concentration of the infrared absorbing materials this may change as a banknote is worn. Thus measurement of the absorption at a locus of the banknote or other article may provide an indication of the quality of the article. The present invention may therefore provide a screening method to detect inferior banknotes or other articles.

According to a sixth aspect of the present invention there is provided a method of assessing the quality of an article of the second aspect, the method comprising measuring at a locus of the article which carries the first and second infrared absorbing materials, the absorption $A_1$ of at least one wavelength of $\lambda_1$ of radiation in the infra-red range and comparing the absorption with a known standard.

In some embodiments the method of the sixth aspect may involve further measuring at the locus of the article which carries a coating or image of the first and second infrared absorbing materials the absorption $A_2$ of a second wavelength $\lambda_2$ of radiation in the infra-red range, calculating the ratio of $A_1$ to $A_2$ and comparing this with a known standard.

The method of the sixth aspect may be used to provide an automatic screening method. For example the infra-red absorption $A_1$ and $A_2$ of banknotes can be measured and compared with a standard in an automated system. Banknotes which conform closely with the standard ratio can be redistributed whereas those on which the image has deteriorated can be withdrawn from circulation.

The invention will now be further described with reference to the following non-limiting examples.

EXAMPLE 1

12 wt % of pigment A and 5 wt % of pigment B were dosed into a lime green offset printing ink. Pigment A is a reduced indium tin oxide comprising 10 mol % tin in an indium oxide matrix.

Pigment B is the compound:

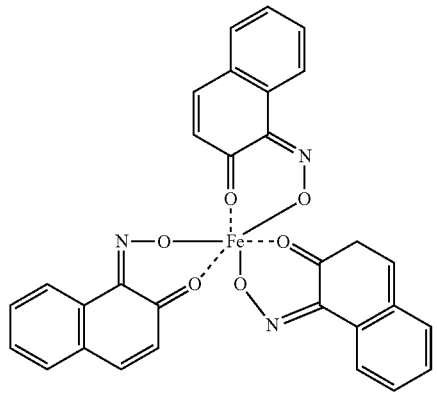

A print of the original offset ink at the thickness of 1 to 2 microns was made and a print of the ink comprising pigment A and pigment B was also made at the same thickness. The infrared spectra of the prints were recorded and are shown in FIG. 1.

To the naked eye the prints look identical and as FIG. 1 shows the spectra are very similar in the visible range but quite different in the infrared region of the electromagnetic spectrum.

EXAMPLE 2

Two blue ink compositions were prepared. Composition 1 contained 20 wt % of pigment C, an antimony doped tin oxide containing 10 wt % antimony. Composition 2 contained 20 wt % of pigment C and 0.3 wt % pigment B.

Figure 2:
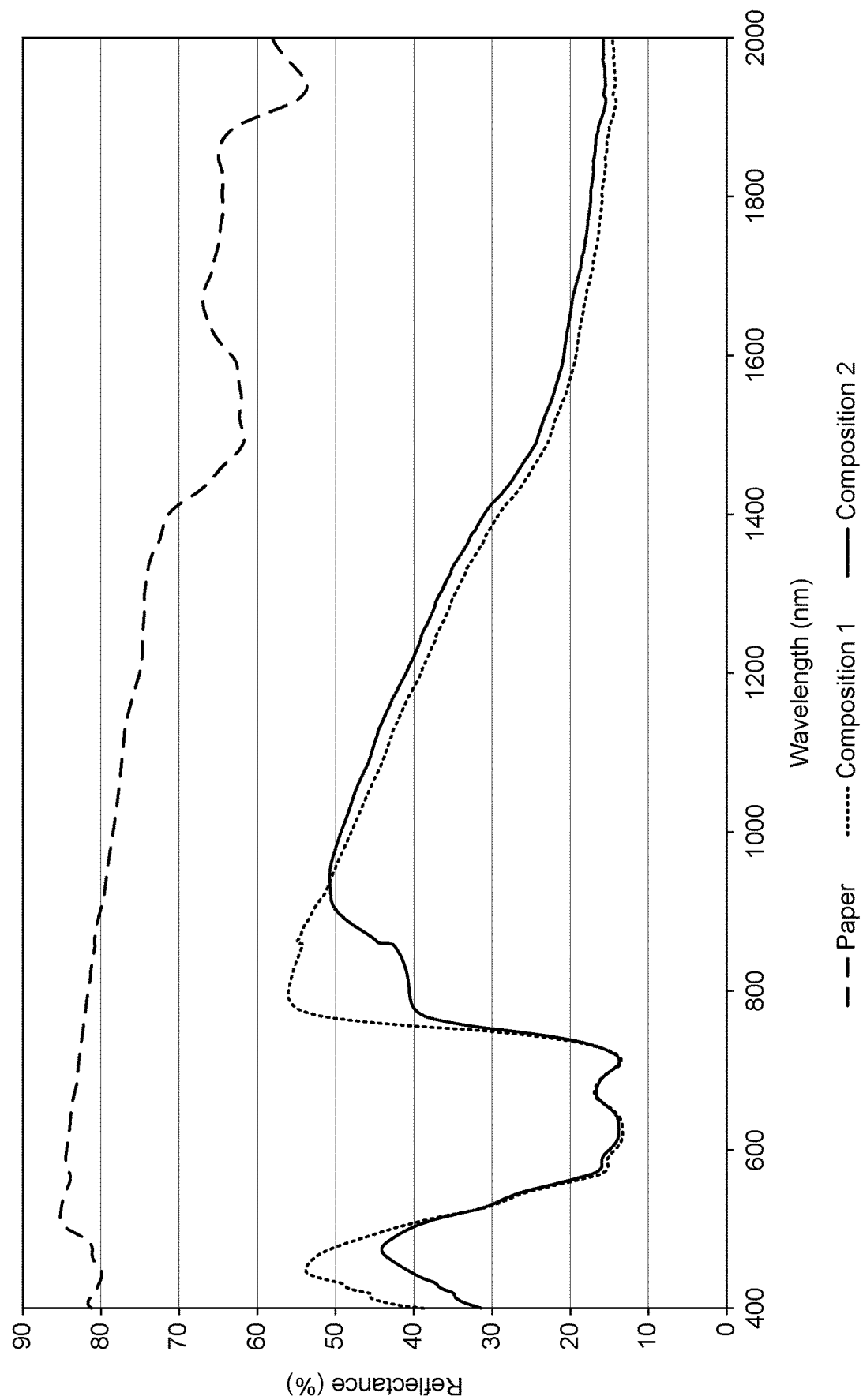

Compositions 1 and 2 were printed at a thickness of approximately 8 microns. Infrared spectra of the prints were recorded and are shown in FIG. 2. The spectra were very similar in the visible region and could not be distinguished by the naked eye. The spectra are closely similar at infrared wavelengths above 950 nm. However there is a significant difference in the region 800 to 900 nm. Thus specific apparatus which detect radiation at these wavelengths would be needed to distinguish these prints.

The invention claimed is:

1. A composition comprising a first infrared absorbing material which is a doped metal oxide comprising indium and/or tin; and a second infrared absorbing material which is a compound selected from:

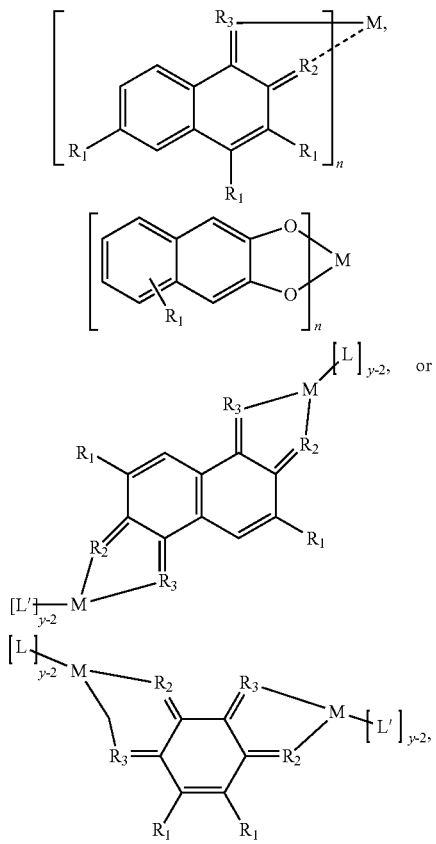

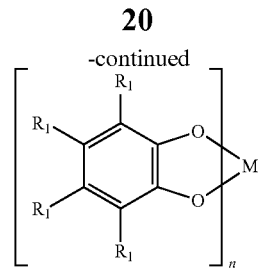

or a salt or polymer of said compound, wherein
M is a metal selected from a group 3-10 element or a lanthanide;
$R_1$ is selected from hydrogen, phosphonate, sulphonate, nitro, halo, cyano, thiocyano, thioalkyl, thioaryl, alkyl, alkoxy, aryl, aryloxy, amines, substituted amines and substituted aryl;
one of $R_2$ and $R_3$ is oxygen and the other of $R_2$ and $R_3$ is NO;
n is a number corresponding to half a co-ordination number of the metal M;
each L and L' is independently a ligand complexed to the metal M; and
y is a number corresponding to the co-ordination number of the metal M.

2. A composition according to claim 1 wherein the first infrared absorbing material is a doped tin oxide or a doped indium oxide.

3. A composition according to claim 1 wherein the first infrared absorbing material is a doped tin oxide comprising from 2 to 20 mol % of one or more dopant elements selected from indium, antimony, tungsten, phosphorus, copper, niobium, manganese, fluorine and nickel.

4. A composition according to claim 3 wherein the first infrared absorbing material is an antinomy doped tin oxide.

5. A composition according to claim 1 wherein the first infrared absorbing material is an indium oxide doped with 1 to 20 mol % tin.

6. A composition according to claim 1 wherein the first infrared absorbing material is selected from antinomy doped tin oxide, tin doped indium oxide and reduced tin doped indium oxide.

7. A composition according to claim 1 wherein the second infrared absorbed material is selected from salts having one of the following formulae:

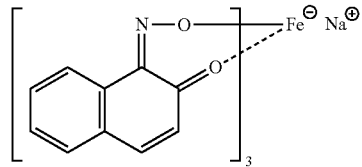

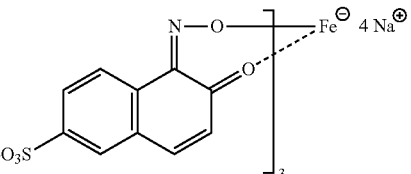

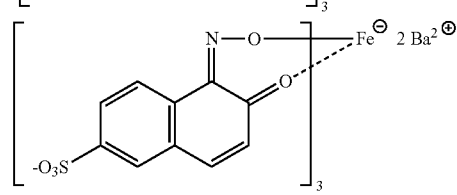

-continued

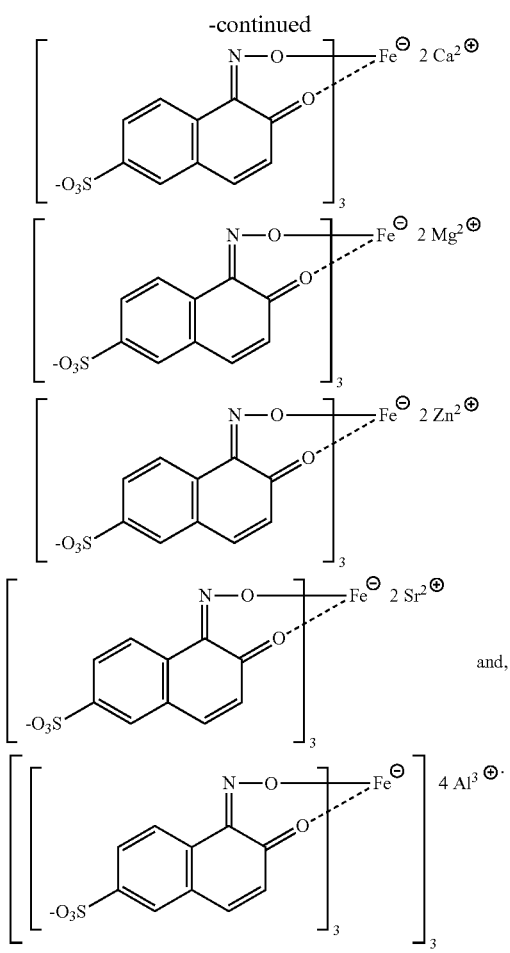

8. A composition according to claim 1 wherein the second infrared absorbing material has the formula

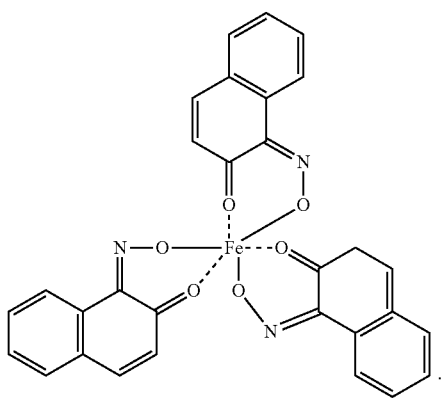

9. A composition according to claim 1 which is an ink composition.

10. A composition according to claim 1 comprising 0.1 to 50 wt % of the first infrared absorbing material and 0.01 to 50 wt % of the second infrared absorbing material.

11. A method of providing a covert security image or a hidden coating on a banknote, the method comprising applying a first infrared absorbing material and a second infrared absorbing material according to claim 1 to said banknote.

12. An article comprising a substrate which carries a first infrared absorbing material which is a doped metal oxide comprising indium and/or tin and a second infrared absorbing material which is a compound selected from:

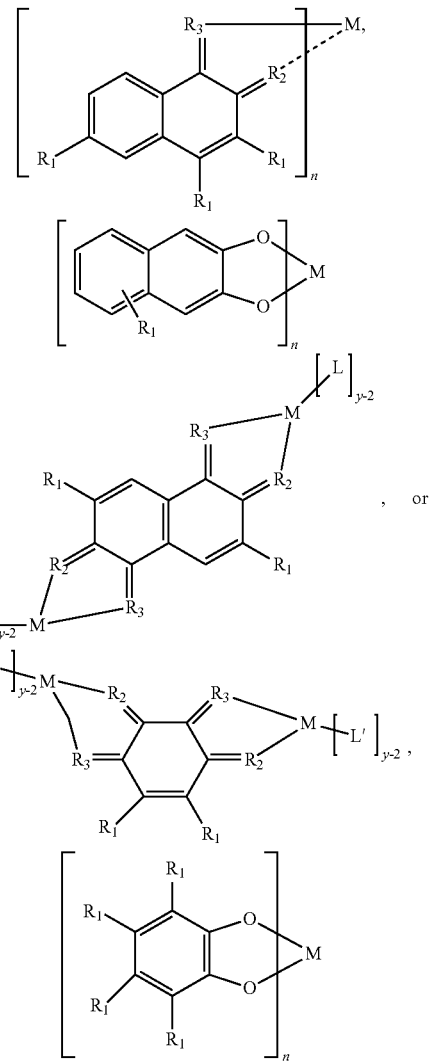

or a salt or polymer of said compound, wherein
M is a metal selected from a group 3-10 element or a lanthanide;
$R_1$ is selected from hydrogen, phosphonate, sulphonate, nitro, halo, cyano, thiocyano, thioalkyl, thioaryl, alkyl, alkoxy, aryl, aryloxy, amines, substituted amines and substituted aryl;
one of $R_2$ and $R_3$ is oxygen and the other of $R_2$ and $R_3$ is NO;
n is a number corresponding to half a co-ordination number of the metal M;
each L and L' is independently a ligand complexed to the metal M; and
y is a number corresponding to the co-ordination number of the metal M.

13. An article according to claim 12 which is a banknote.

14. An article according to claim 12 wherein the first infared absorbing material and the second infared absorbing material are provided at a locus of the article and wherein the locus of the article which carries the first and second infrared absorbing materials has an absorbance of at least 50% of at least one wavelength in the range 800-900 nm and an absorbance of at least 50% of at least one wavelength in the range 1000-1500 nm.

15. An article according to any of claim 12 wherein the first and second infrared absorbing materials are included within or on a surface of the substrate and do not substantially alter a colour of the substrate in a visible range.

16. A method of manufacturing an article of claim 12, the method comprising incorporating the first infrared absorbing material and the second infrared absorbing material into or onto the substrate.

17. A method of detecting a genuine article as claimed in claim 12, the method comprising measuring at a locus on the article an absorption $A_1$ of radiation at a first wavelength $\lambda_1$, and an absorption $A_2$ of radiation at a second wavelength $\lambda_2$, wherein $\lambda_1$ and $\lambda_2$ are in a range of 700 to 2000 nm.

18. A method of assessing a quality of an article as claimed in claim 12, the method comprising measuring at a locus of the article which carries the first and second infrared absorbing materials, an absorption $A_1$ of at least one wavelength of $\lambda_1$ of radiation in a range of 700 to 2000 nm.

* * * * *

UNITED STATES PATENT AND TRADEMARK OFFICE
CERTIFICATE OF CORRECTION

| | | |
|---|---|---|
| PATENT NO. | : 11,046,104 B2 | Page 1 of 1 |
| APPLICATION NO. | : 16/639855 | |
| DATED | : June 29, 2021 | |
| INVENTOR(S) | : David Malcolm Lewis and David Bedford | |

It is certified that error appears in the above-identified patent and that said Letters Patent is hereby corrected as shown below:

On the Title Page

Item (54) and in the Specification Column 1, Line 1, the title "Security Printing" should read -Improvements in Relation to Security Printing-.

Signed and Sealed this
Twenty-fourth Day of September, 2024

Katherine Kelly Vidal
*Director of the United States Patent and Trademark Office*